United States Patent [19]

Laclave et al.

[11] Patent Number: 5,142,834
[45] Date of Patent: Sep. 1, 1992

[54] VEHICLE TRIM ASSEMBLY AND FASTENER THEREFOR

[75] Inventors: Thomas J. Laclave, Lake Orion; Keith A. Nieboer, Holland, both of Mich.

[73] Assignee: Donnelly Corporation, Holland, Mich.

[21] Appl. No.: 552,308

[22] Filed: Jul. 12, 1990

[51] Int. Cl.⁵ .................................. F16B 21/02
[52] U.S. Cl. .................................. 52/208; 52/716; 411/349; 411/553; 24/453; 403/348; 296/201
[58] Field of Search ............... 52/208, 716, 717, 718; 411/340, 349, 350, 554, 553; 403/348, 349, 409.1; 24/453, 297, 287, 590; 296/201

[56] References Cited

U.S. PATENT DOCUMENTS

| | | |
|---|---|---|
| 306,874 | 10/1884 | Thatcher . |
| 2,350,255 | 5/1944 | Shippee et al. . |
| 2,620,539 | 12/1952 | Poupitch . |
| 2,626,773 | 1/1953 | Backman ............... 411/349 X |
| 2,765,698 | 10/1956 | Devine .................. 411/340 |
| 2,811,765 | 11/1957 | Mathews, Jr. et al. . |
| 2,984,877 | 5/1961 | Perrochat . |
| 3,116,526 | 1/1964 | Cochran . |
| 3,220,078 | 11/1965 | Preziosi . |
| 3,304,681 | 2/1967 | Wunderlich . |
| 3,323,181 | 6/1967 | Seckerson . |
| 3,568,263 | 3/1971 | Meehan . |
| 3,588,968 | 6/1971 | Heilman . |
| 3,800,369 | 4/1974 | Nikolits et al. . |
| 3,852,849 | 12/1974 | Pestka . |
| 3,954,344 | 5/1976 | Nakama ............... 403/348 X |
| 3,956,803 | 5/1976 | Leitner . |
| 4,007,516 | 2/1977 | Coules . |
| 4,072,340 | 2/1978 | Morgan . |
| 4,139,234 | 2/1979 | Morgan . |
| 4,342,139 | 8/1982 | Tanaka . |
| 4,506,419 | 3/1985 | Mitomi . |
| 4,545,697 | 10/1985 | Verdenne et al. . |
| 4,626,155 | 12/1986 | Hlinsky et al. ......... 403/348 X |
| 4,762,437 | 8/1988 | Mitomi .................. 411/349 X |
| 4,821,381 | 4/1989 | Kaneko et al. . |
| 4,948,315 | 8/1990 | Limberis ............... 411/349 |

FOREIGN PATENT DOCUMENTS

| | | |
|---|---|---|
| 662135 | 4/1963 | Canada . |
| 700506 | 12/1964 | Canada . |
| 741059 | 8/1966 | Canada . |
| 1107029 | 8/1958 | Fed. Rep. of Germany . |
| 0829128 | 2/1960 | United Kingdom ......... 411/349 |
| 1098642 | 1/1965 | United Kingdom . |
| 1217206 | 2/1968 | United Kingdom . |

OTHER PUBLICATIONS

Photographs of vehicular window trim assembly manufactured by Donnelly Corporation, Holland, Michigan on sale in the United States for more than one year prior to the filing date of this patent application.

*Primary Examiner*—David A. Scherbel
*Assistant Examiner*—Robert Canfield
*Attorney, Agent, or Firm*—Price, Heneveld, Cooper, DeWitt & Litton

[57] ABSTRACT

A rotatable fastener for attaching trim strips to vehicle window assemblies and other vehicular trim supports includes a pair of trim engaging flanges at one end of a central shaft and a retaining head at the other end. The flanges are beveled to engage the edges of a trim strip slot upon one-quarter turn rotation after insertion through an aperture in the window assembly or trim support. The retaining head includes recesses for engaging projections on the window assembly or trim support after rotation to resist removal. The flanges are preferably offset and the aperture shaped to receive the offset flanges and central shaft to resist fastener movement in the aperture and slot. Alternately, the fastener may include a planar head while the flanges may each include a flexible portion and slot for reducing the width of the flanges upon insertion.

36 Claims, 6 Drawing Sheets

VEHICLE TRIM ASSEMBLY AND FASTENER THEREFOR

BACKGROUND OF THE INVENTION

This invention relates to fasteners and trim assemblies for vehicles using such fasteners and, more particularly, to a vehicle trim fastener adapted for insertion by rotation to provide secure retention of the trim member without the need for mating clips.

It is well-known to attach decorative trim strips to vehicles and other supports by various types of fasteners. For example, U.S. Pat. No. 2,984,877, U.S. Pat. No. 3,116,526 and U.S. Pat. No. 3,304,681 all disclose fasteners for securing decorative trim to support panels and especially vehicles. Each of these prior fasteners, however, is adapted for initial attachment to a panel or vehicle followed by snapping on or attaching the trim strip to the prepositioned fastener. These fasteners do not allow positioning of the fastener and attachment of the strip all in one operation.

In another prior known trim assembly, a hollow, elongated trim strip with a generally C-shaped cross section has screw receiving clips inserted and crimped at various locations within the hollow trim. Thereafter, the trim is positioned on a preformed, flexible rubber or polymeric mount or molding and threaded screws are inserted through apertures in the back of the preformed molding into the prepositioned clips in the trim strip. Such prior assembly has several drawbacks, however. For example, the requirement of staking the fastener receiving clips into the trim piece often causes scraping or marring of the exterior trim surface requiring rejection of the part as unusable. In addition, the inclusion of the fastener clips in the trim occupies additional space when the strips are packed together for shipment to the manufacturing site thereby increasing shipping costs due to wasted space in shipping boxes. Moreover, assembly of the trim strips including the prepositioned clips on molding such as along the edges of windows on vehicles requires precise alignment of the trim strip with the preformed apertures in the molding followed by insertion of a separate screw through the molding into the clip. This is very time-consuming, often difficult, and results in additional cost for the assembly.

Accordingly, a need existed for a simplified fastening system and fastener which would allow insertion of a fastener and attachment of trim in one operation, avoid the prepositioning or staking of fastener clips in trim molding strips, avoid waste in shipping space when trim moldings are shipped, avoid the need to precisely locate the trim on preformed moldings followed by the insertion of a separate fastener in registry with the prepositioned clip, and eliminate the need for a separate clip thereby lessening assembly time, reducing costs and simplifying manufacturing installation of trim strips on vehicles.

SUMMARY OF THE INVENTION

Accordingly, the present invention provides a fastener and a trim assembly incorporating such fastener which overcomes the above problems and provides a one piece fastener adapted for insertion by rotation to attach a trim member to a trim support such as an encapsulated molded window assembly or other trim molding to be secured to a vehicle.

In one form, the invention provides a fastener adapted to be rotated upon insertion in a support element for attaching a first member to the support element, the fastener comprising a shaft having two ends and a central axis, at least one flange at one end of the shaft for engaging the first member and a retaining head at the other end of the shaft. The flange extends outwardly from the shaft. The retaining head includes locking means for engaging at least one projection on the support element following rotation of the fastener to retain the fastener, the support element and the first member together. In addition, the retaining head includes camming means for engaging the projection during rotation to position the locking means in engagement with the projection.

In a preferred form of the invention, a gripping flange is included on the retaining head to allow rotation and insertion of the fastener. Also, a pair of the flange members may be provided at the shaft end for engaging the first or trim member, the flanges including beveled surfaces for cooperation with the trim strip. Preferably, the flanges are laterally offset from one another and the central axis of the fastener shaft while the aperture through the support element is shaped to receive the offset flanges such that the fastener is generally centered in the aperture and prevented from sliding along both the aperture and the elongated slot of the trim molding during insertion.

Alternately, the flanges may include flexible means for reducing the width of the flanges upon rotational insertion in the first member. Specifically, the flanges include a slot and two separate but adjacent portions, one portion being generally rigid and stationary while the other is flexibly joined to the shaft to allow flexure into the slot area upon insertion. The flexible portion resists counterrotation of the fastener.

In other aspects, the retaining head preferably includes at least one recess forming the locking means, the recess being circumferentially aligned with the camming means which include a sloped surface on the underside of the retaining head such that the retaining head is cammed up and over the projection on the support element for receipt in the recess to prevent removal of the fastener after insertion.

In yet other forms of the invention, the fastener is combined with a trim member and a support element for supporting the trim member. When the fastener is inserted through an aperture in the support element into an elongated slot in the generally C-shaped trim member, rotation causes the flanges of the fastener to engage the trim member while the retaining head is cammed up and over the projection on the support element for receipt in the recess to prevent removal.

Accordingly, mounting and attachment of trim members to various types of support elements including encapsulated modular windows, trim supports and the like is accomplished in a single simplified operation by insertion of the one piece fastener through an aperture into engagement with the trim strip followed by rotation into the final position. Only a 90° or quarter turn rotation of the fastener is required. The fastener avoids the need to locate the trim strip precisely on the trim support prior to mounting while simplifying attachment and reducing the time required for attachment of the trim strip The fastener also eliminates the need for prepositioning any fastener clips in the trim thereby reducing the rejection rate of the trim strips due to marring during staking or other attachment of such clips. Moreover, when the fastener secures the trim in place, the trim is automatically centered on the support area of the window assembly or trim support by the camming action of the fastener in the trim. Further, with the fastener which has locking and camming means, retention of the fastener and trim is strong and secure due to the recesses provided in the retaining head.

These and other objects, advantages, purposes and features of the invention will become more apparent from a study of the following description taken in conjunction with the drawings.

DESCRIPTION OF THE PREFERRED EMBODIMENTS

Figure 1:
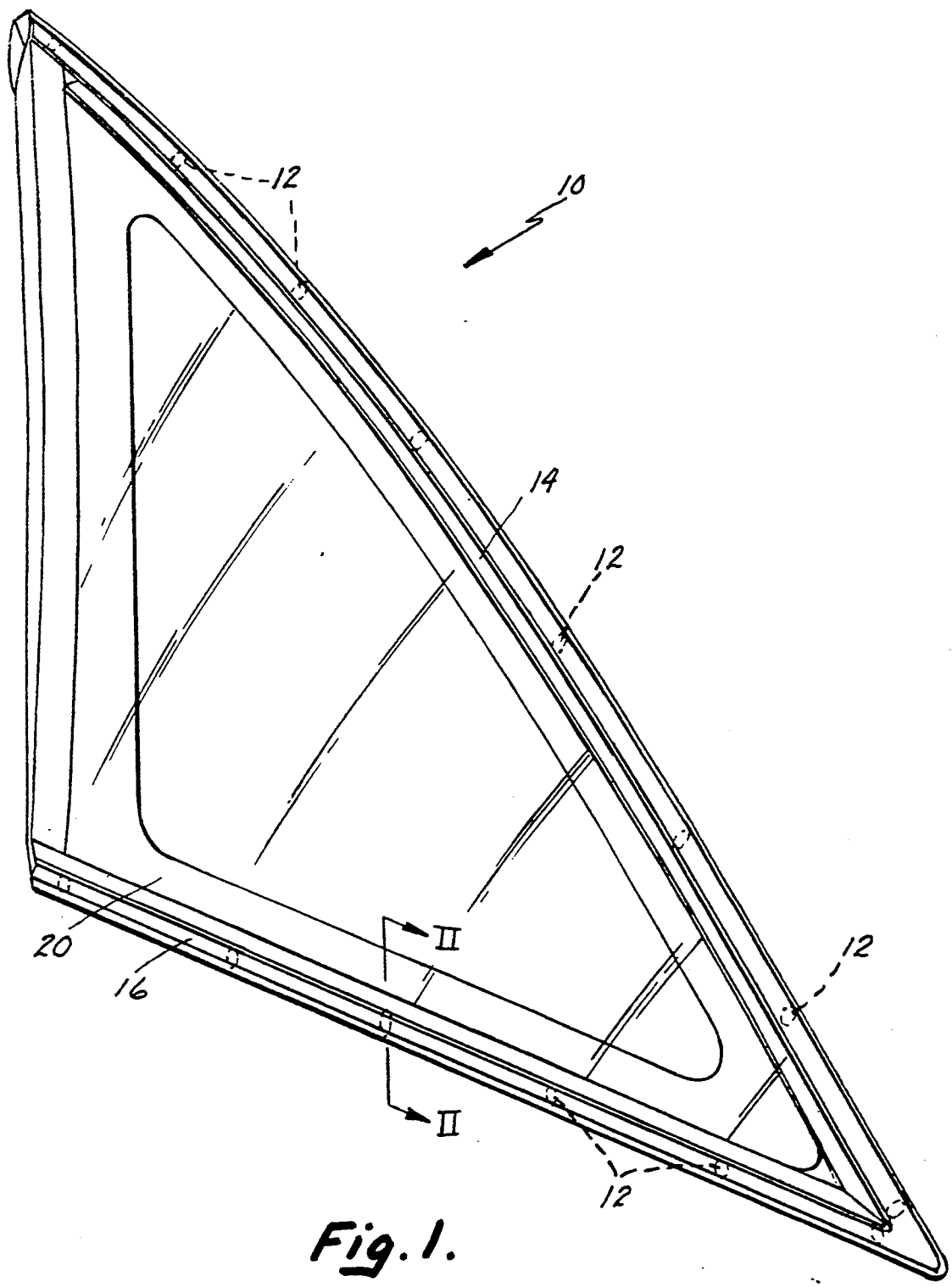
FIG. 1 is a perspective view of an encapsulated, modular, vehicular window assembly incorporating decorative trim strips along two edges of the assembly, the trim strips secured in place with fasteners of the present invention.
Figure 2:
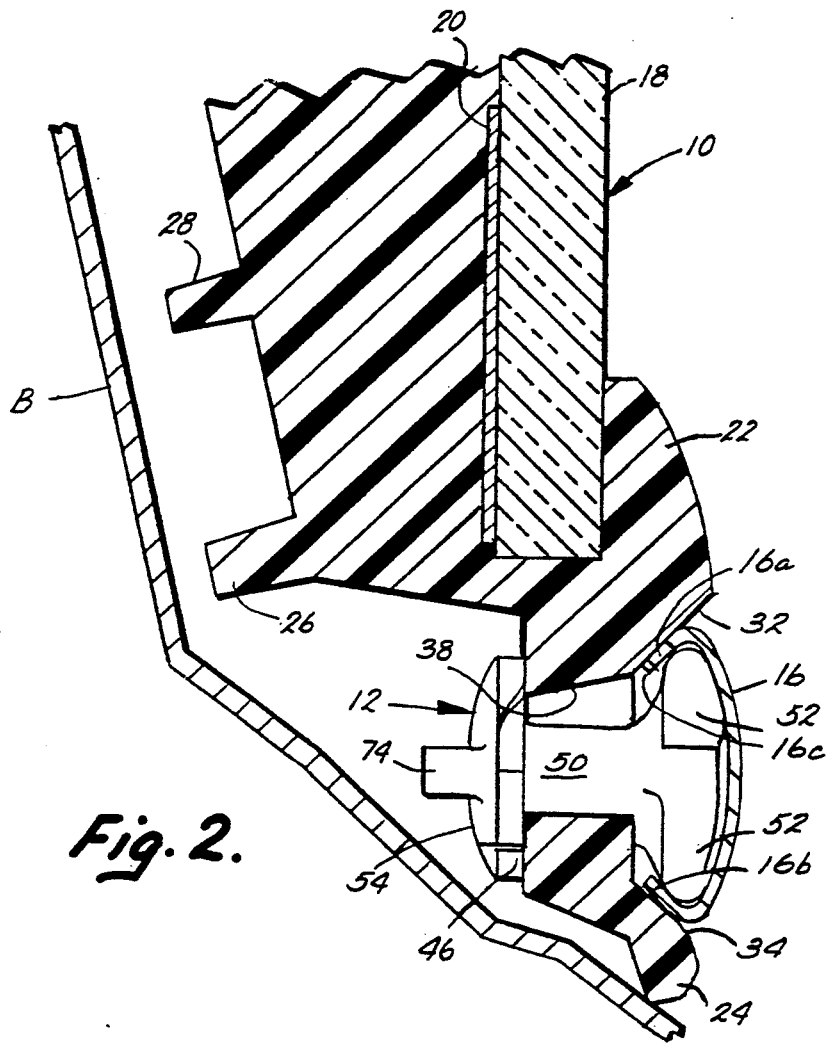
FIG. 2 is a fragmentary, sectional side elevation taken along plane II—II of FIG. 1 showing the assembly adjacent a window opening in a vehicle body.
Figure 3:
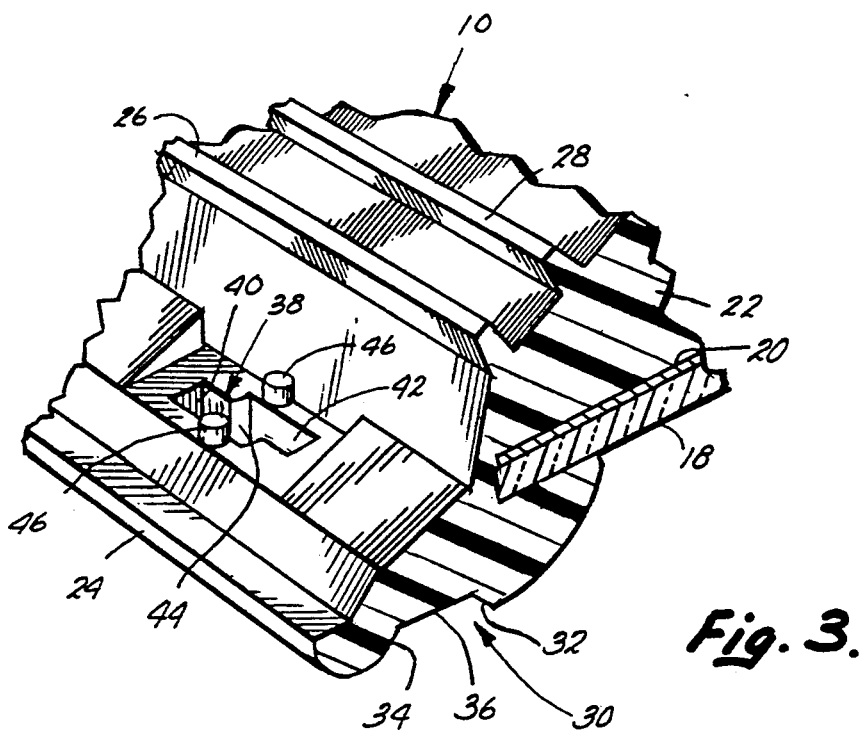
FIG. 3 is a fragmentary, perspective view shown partially in section of the fastener receiving area on the interior side of the window assembly shown in FIGS. 1 and 2.

Referring now to the drawings in greater detail, FIGS. 1-3 illustrate a preferred form 10 of an encapsulated, modular window assembly incorporating a plurality of fasteners 12 of the present invention securing decorative metallic trim strips 14 and 16 in place on the exterior side of the window assembly. Window assembly 10 includes a sheet of transparent glass, plastic or other sheet material 18 having a border layer of black or other dark frit material or paint 20 applied over and fired onto the peripheral portions of the inner surface of the sheet. Molded about the entire periphery of the sheet 18 is a gasket or casing 22 formed from polyvinylchloride (PVC) or reaction injection molded polyurethane (RIM) as shown and described, for example, in U.S. Pat. Nos. 4,072,340 and 4,139,234. The gasket or casing 22 may incorporate rigid metallic fasteners for securing the entire assembly to the sheet metal B (see FIG. 2) of a vehicle body. Peripheral sealing flange portions 24, 26, 28 extend outwardly from the gasket or casing for engaging and sealing against the vehicle body to prevent the entry of water, dirt and other contaminants to the interior of the vehicle. The fastener 12 of the present invention is especially adapted to secure decorative metallic trim strips 14, 16 to the marginal or peripheral portions 24 of the gasket or casing 22 on a window assembly such as that shown at 10 or on other trim support members as described hereinafter.

Preferably, fasteners 12 are adapted for use with a bright finished or other decorative trim strip stamped from sheet metal and painted, anodized, polished or otherwise finished on its exterior surface as desired. Alternately, trim strips of plastic or other materials could be used. The trim strip is preferably C-shaped in section as shown in FIG. 2 and includes rearwardly and inwardly extending flanges 16a, 16b defining an elongated slot 16c at the rear of the trim. The inside surfaces of flanges 16a, 16b are inclined toward elongated slot 16c while the interior of the trim member is hollow for receipt of the fastener flanges as described hereinafter.

The peripheral portion 24 of the gasket or casing adjacent transparent sheet member 18 on window assembly 10 preferably includes an elongated, molded channel or recess 30 having inclined sides 32, 34 leading to a generally planar base 36 as is best seen in FIGS. 2 and 3. Recess 30 is generally provided on the exterior or outwardly facing surface of the window assembly casing such that the trim member will be exposed to the exterior when the window assembly is mounted on the vehicle.

At spaced positions on the opposite or rear surface of peripheral casing 24 of the window assembly are through apertures 38 in alignment and registry with the recessed channel 30. Each aperture 38 preferably includes a pair of end or wing areas 40, 42 which are offset laterally toward opposite sides from the longitudinal center line of the aperture and correspond to the shape and position o flanges 52 on fastener 12 as described below. Ends 40, 42 are generally aligned and parallel to elongated channel 30. Aperture 38 also includes cylindrically curved wall portions 44 extending between the offset ends which are adapted to match the curvature of the cylindrical shaft on the fastener 12 as described hereinafter. Thus, aperture 38 is contoured to the shape of the fastener and, when a fastener 12 is received therein, the aperture resists the longitudinal sliding movement of the fastener along the aperture and the elongated slot 16c in the trim member 16.

Also included adjacent each aperture 38 are a pair of upstanding, cylindrical posts or projections 46 formed immediately adjacent either side of the aperture along the center line of the aperture. As described below, projections 46 are adapted to mate and engage with locking recesses 70 on the retaining head 54 of the fastener to resist removal of the fastener and trim strip after insertion.

With reference to FIGS. 4-9, a preferred form of the fastener 12 is illustrated. Fastener 12 is preferably a one piece member molded from polyester sold under the trademark VALOX by General Electric Company of Schenectady, N.Y. or a similar material Such material is relatively hard, stiff, tough and wear resistant and has significant torsional rigidity to allow maintenance of its structural integrity upon twisting and rotation when installed. Each fastener 12 includes a cylindrical shaft 50 having a central axis, a pair of radially outwardly extending, oppositely directed flanges 52 at one end of the shaft and a configured, circular retaining head 54 at the opposite end of the shaft.

Figure 4:
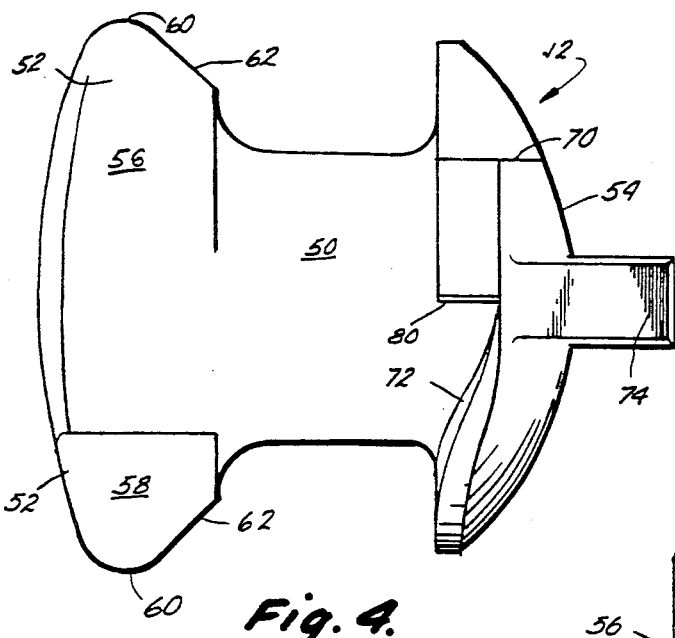
FIG. 4 is a side elevation of the rotational fastener of the present invention as used in the assembly of FIGS. 1-3.
Figure 7:
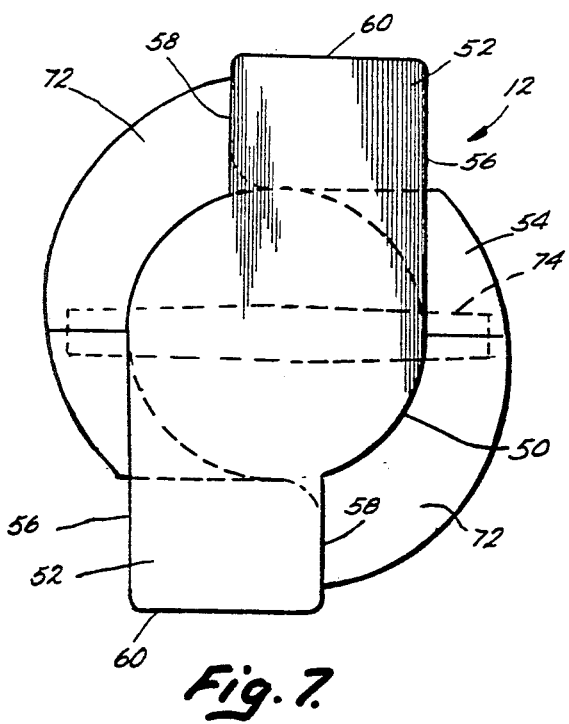
FIG. 7 is an end elevation of the fastener of FIGS. 4-6 taken from the trim strip engaging or flange end of the fasteners.

As is best seen in FIGS. 4, 5, 7 and 8, the outer surface 51 of the flange end of fastener 12 is rounded outwardly in a convex manner extending from one end of the opposed flanges 52 to the other. Such convex shape matches the interior surface of the trim member 16 as shown in FIG. 2. As shown in FIG. 7, flanges 52 are preferably laterally offset from the center line of shaft 50 in opposite directions such that one side of each is tangentially aligned with a surface of the cylindrical shaft 50. Each flange includes side surfaces 56, 58, side 56 being tangentially aligned with the shaft and longer than side surface 58. The end surface 60 of each flange is preferably formed at right angles to side surfaces 56, 58. In addition, end surface 60 is rounded as shown in FIG. 4 on each flange, while the underside is inclined or beveled toward the cylindrical shaft as shown at 62. The angle of the bevel is adapted to match the angle of the interior surfaces of flanges 16a, 16b on the trim member.

As will be best understood from FIGS. 4, 5, 6 and 9, retaining head 54 at the opposite end of shaft 50 from flanges 52 is generally circular in shape and includes opposed lock recesses 70 on diametrically opposite sides of head 54. A pair of sloped camming surfaces 72 are circumferentially aligned with and lead to recesses 70. In addition, an upstanding, generally planar gripping flange 74 extends across a diameter of head 54 and outwardly away from the head to provide a gripping surface for rotational insertion of the fastener.

Figure 5:
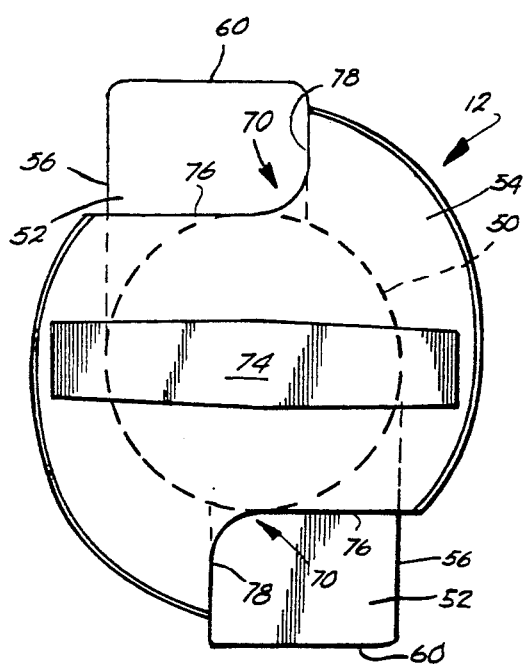
FIG. 5 is an end view of the fastener of FIG. 7 taken from the retaining head end.
Figure 6:
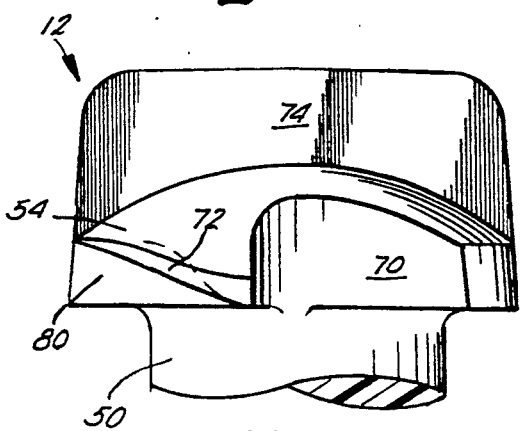
FIG. 6 is a fragmentary side elevation of the fastener of FIGS. 4 and 5 taken in the direction of the arrow in FIG. 5 and 90° from the view of FIG. 4.
Figure 8:
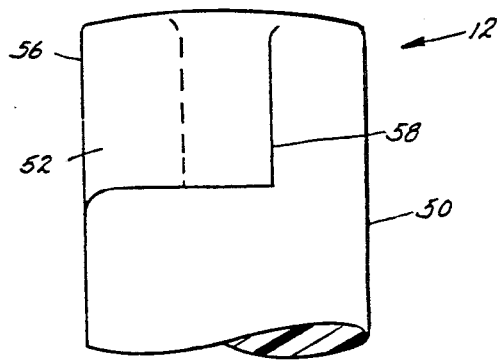
FIG. 8 is a fragmentary side elevation of the trim engaging end of the fastener of FIGS. 4-7.

As shown in FIGS. 4-6, recesses 70 extend inwardly of the circumferential edge of retaining head 54 and are defined by a generally L-shaped wall including a longer, generally rectilinear portion 76 which generally parallels gripping flange 74 and an abutment portion 78 which extends at a right angle to wall 76. Abutment 78 provides a stop which engages one of the projections 46 on a support element such as window assembly 10 as described above adjacent aperture 38 as shown in FIG. 12. Likewise, wall 76 also engages the projection in the final inserted position such that wall portions 76, 78 on both recesses resist counterrotation and removal of the fastener after insertion. The radius of the wall between portion 76 and 78 is preferably matched to the radius of projections 46. Since the fastener is generally symmetrical about a plane passing through gripping flange 74, the fastener is neither right- nor left-handed and thus may be inserted without regard to its initial position.

Figure 9:
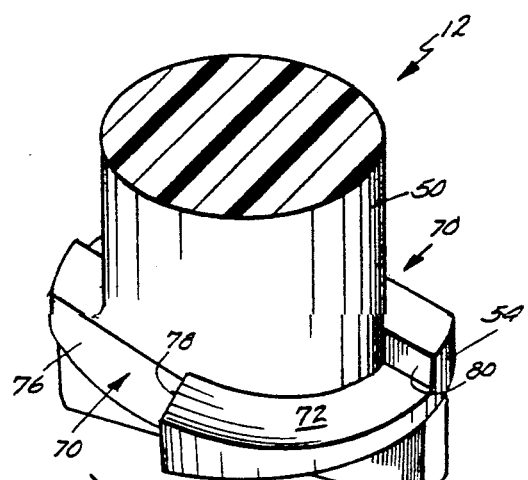
FIG. 9 is a fragmentary, perspective view of the underside of the retaining head of the fastener of the present invention.

As is best seen in FIGS. 4, 6 and 9, sloped camming surfaces 72 on the underside of head 54 serve as ramps to position the fastener 12 with respect to projections 46 upon rotational insertion. The start position for the camming surfaces 72 is adjacent a wall or abutment 80 at a first position along the longitudinal axis of shaft 50. From the start position, the camming surface 72 slopes toward shaft end 51 which includes flanges 52 as it progresses circumferentially around the shaft as shown in FIG. 9 to a second position spaced toward the flange end along the shaft axis from the start position. The camming surfaces each terminate at wall 78 of recess 70. Upon insertion, the projections 46 initially are received adjacent abutment 80 and, during rotation, the sloped camming surfaces ride along the tops of the projections and pull or urge the flanges at the opposite end of the shaft, as well as the trim member with which they are engaged, toward the position of the projections. After rotating the shaft and fastener through 90°, the projections reach wall 78 and are received within recesses 70 between walls 76 and 78 as described above. Walls 76, 78 prevent counterrotation as mentioned and, hence, resist removal of the fastener.

Figure 10:
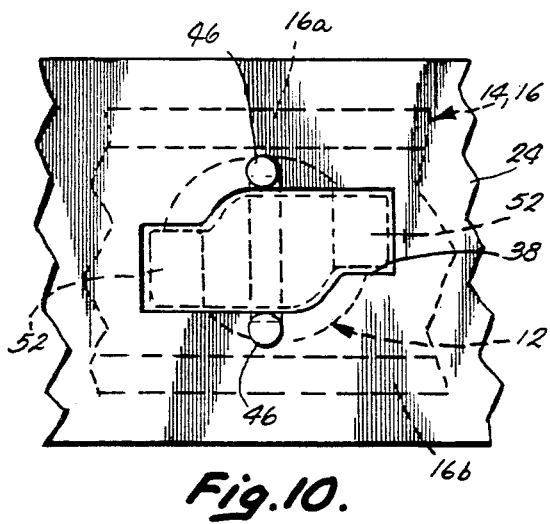
FIG. 10 is a fragmentary, plan view of the fastener receiving aperture in a support element such as a window assembly showing the fastener in phantom in its initial position upon insertion in the aperture.
Figure 11:
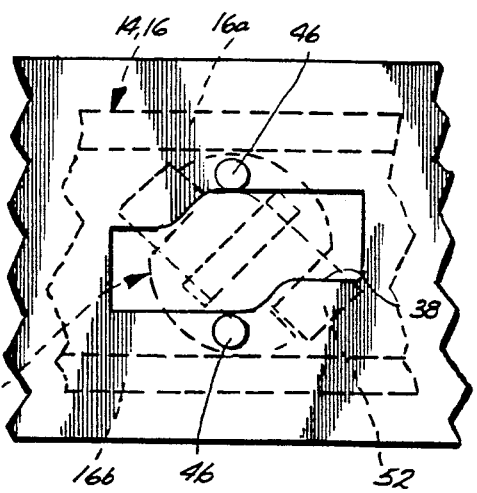
FIG. 11 is a plan view similar to FIG. 10 but showing the fastener rotated in the aperture through approximately 45° or one-eighth of a turn.
Figure 12:
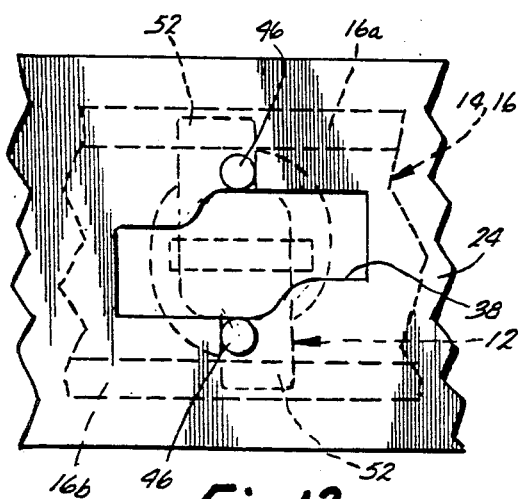
FIG. 12 is a plan view similar to FIGS. 10 and 11 but showing the fastener of the present invention fully rotated through 90° or one-quarter turn to its final trim engaging position.

This sequence of rotational insertion is shown in FIGS. 10-12. In FIG. 10, the fastener 12 is initially inserted with flanges 52 matching the shape of the aperture 38 such that the flanges are slid from the rear side of the rear opening of the aperture toward the recessed channel 30 on the exterior side of the aperture. In this position, projections 46 are received adjacent walls 80 at the beginning end of sloped camming surfaces 72. Also, flanges 52 are aligned with elongated slot 16c in the trim member.

Upon initial rotation of the fastener 12 after flanges 52 have been passed entirely through aperture 38 as shown in FIG. 11, the engagement of the camming surfaces 72 with the projections 46 urge the fastener, flanges 52 and the trim member engaged thereby away from recess 36 on the exterior side as shown in FIG. 11. At the same time, flanges 52, and specifically end surfaces 60, 62, begin engagement with trim flanges 16a, 16b.

As fastener 12 is rotated into its final position as shown in FIG. 12, flanges 52 complete their engagement with flanges 16a, 16b of trim 14, 16 such that the flanges are perpendicular to the longitudinal axis of aperture 38 and perpendicular to slot 16c. At the same time, projections 46 have reached the end of sloped camming surfaces 72 and have entered recesses 70 to engage walls 76, to prevent counterrotation and removal of the fastener. In this position, the beveled undersurfaces 62 of flanges 52 engage the inside surfaces of the trim flanges 16a, 16b and hold the trim member tightly against angled sides 32, 34 of recess 30 as shown in FIG. 2.

Figure 13:
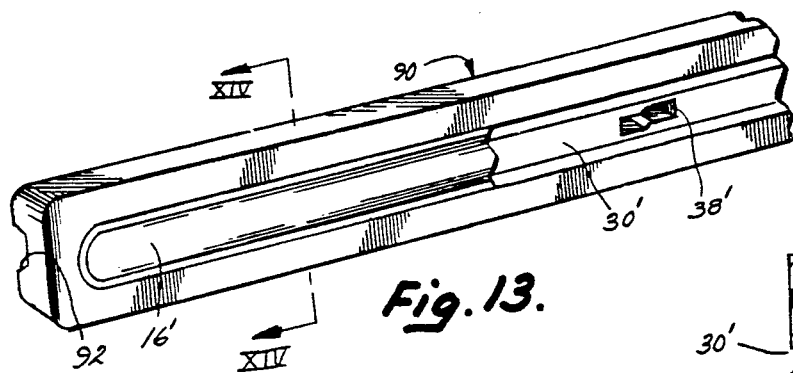
FIG. 13 is a perspective view with portions broken away of an alternate trim support adapted to receive a trim strip and fastener of the present invention.
Figure 14:
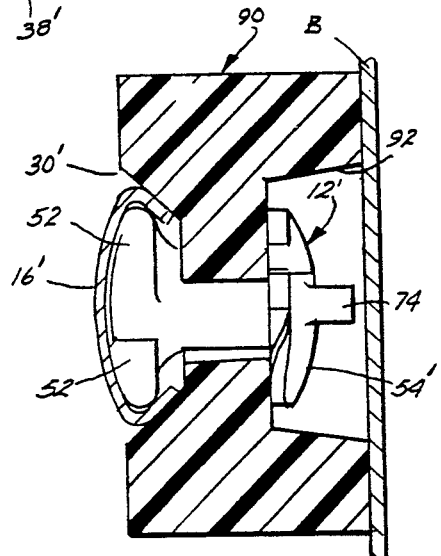
FIG. 14 is a sectional side elevation of the trim assembly of FIG. 13 taken along plane XIV—XIV showing the fastener of the present invention securing a trim strip on a trim support.

Fasteners 12 may also be used to mount trim members on vehicle body moldings or other support elements not necessarily only on molded window assemblies. For example, as shown in FIGS. 13 and 14, where like parts to those in embodiment 10 are described by like prime numerals, a vehicular body molding or trim support 90 preferably molded from polyvinylchloride (PVC) or reaction injected molded polyurethane (RIM) material includes an elongated trim member channel or recess 30' receiving a trim member 16' secured by a plurality of fasteners 12'. In this case, trim support 90 includes a recess 92 on its rear surface at the position of each fastener or, alternately, an elongated recess for receiving a plurality of fasteners. As with the window assembly, a plurality of fastener receiving apertures 38' is provided at spaced locations along channel 30' in alignment therewith and contoured to the shape of the flange end of fasteners 12'. Recess 92 is deep enough to receive the entire height of retaining head 54' when fastener 12' is inserted and rotated to engage and retain trim member 16' as shown in FIG. 14. Thereafter, the trim molding may be secured by adhesive or other fasteners to the vehicle body sheet metal B.

Figure 15:
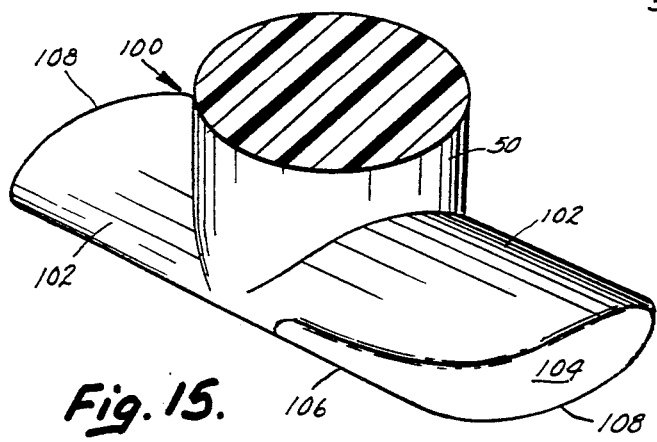
FIG. 15 is a fragmentary, perspective view of the trim engaging end of a second embodiment of the fastener of the present invention.
Figure 16:
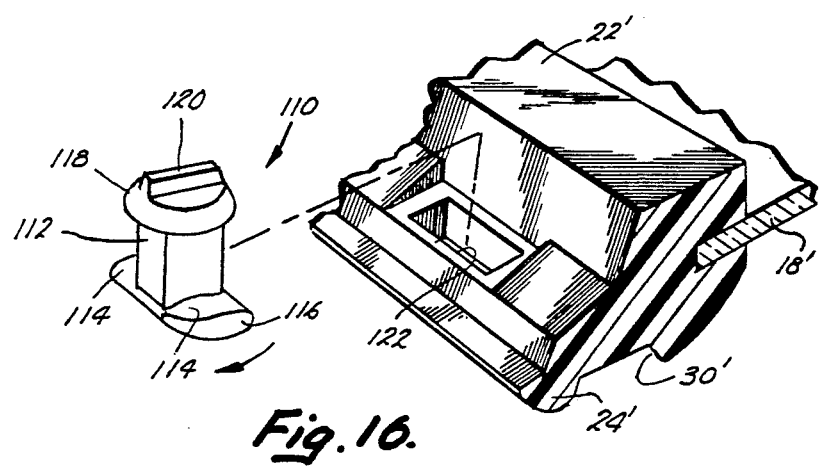
FIG. 16 is a fragmentary, perspective view of a third embodiment of the fastener of the present invention and an alternate embodiment of a fastener receiving aperture in a window assembly the present invention.

As shown in FIGS. 15 and 16, an alternate embodiment 100 of the fastener is disclosed. In fastener 100, where like numerals equal like parts to those in fastener 12, a pair of aligned trim member engaging flanges 102 are provided which are not offset from the central axis of the cylindrical shaft 50. Flanges 102 are preferably used with a retaining head 54 like that of fastener 10 and including locking recesses and camming surfaces. In this case, flanges 102 are shaped more like air foils but do include tapered lead-in surfaces 104 extending from the edge of each flange at 106 around the corner of the flange to end 108 where it terminates at the opposite side of the flange. Surfaces 104 are also inclined or beveled toward shaft 50. The tapered lead-in surfaces 104 serve as ramps or cams to help flanges 102 engage the inside surfaces of the trim member flanges 16a, 16b when the fastener 100 is inserted and rotated in the manner described above.

Yet another embodiment of the rotational fastener 110 is illustrated in FIG. 16. In this form, the fastener includes a shaft 112 which is square in section and has planar side surfaces 113 extending at right angles to one another. At one end of shaft 112 are a pair of aligned flanges 114 including tapered lead-in surfaces 116 substantially similar to those described at 104 above in embodiment 100. At the opposite end of shaft 112 is a circular retaining head 118 including a gripping flange 120 extending outwardly therefrom. The retaining head 118 does not include any recesses or sloped camming surfaces since the square sectioned shaft 112 is adapted to be received in a rectangular aperture 122 extending through the peripheral edge portion of a gasket or casing 24' adhered on transparent sheet 18'. The sides of the elongated aperture 122 fit tightly against a pair of surfaces 113 which ar opposed to one another. As illustrated in FIG. 16, fastener 110 may be inserted through aperture 122 such that flanges 114 engage the elongated slot of a trim piece adapted to be received in recess 30'. The material from which the gasket or casing 24' is formed is sufficiently resilient to temporarily deform when fastener 110 is rotated allowing the corners joining the side surfaces 113 of shaft 112 to rotate past the planar surfaces of the walls of aperture 122. Thus, fastener 110 is rotated from its initial position 90° or one-quarter turn to a position in which flanges 114 engage the trim member and retain it in position in elongated recess 30'. Simultaneously, however, planar side surfaces 113 of shaft 112 engage the sides of aperture 122 and resist further rotation of the fastener thereby resisting removal of the trim member and fastener from casing 24'. Accordingly, in this version, projections 46 adjacent the aperture through the casing may be eliminated and the retaining head 118 is more simply formed than retaining head 54 in fastener 12. Yet, planar side surfaces 113 of the shaft 112 will retain the fastener in place and resist rotation.

Alternately, retaining head 54 used with fastener 12 may also be used with fasteners 100 and 110. In fastener 110, retaining head 54 including locking recesses and sloped camming surfaces would provide additional rotation preventing retention for the fastener. In addition, the shaft 112 of fastener 110 may have other noncircular shapes other than square such as pentagonal, hexagonal, octagonal or others. Further, the laterally offset flanges 52 from fastener 12 may also be incorporated in fastener 110. Preferably, embodiments 100 and 110 of the fastener are also molded in one piece from the VALOX TM material mentioned above. However, it is also possible to form the fasteners from metal via casting, machining or the like.

A further embodiment 130 of the rotational fastener is illustrated in FIGS. 17-22. Like the other fasteners mentioned above, fastener 130 is preferably a one piece member molded from VALOX TM material and includes a cylindrical shaft 132 having a central axis, a pair of radially outwardly extending, oppositely directed flange members 134 at one end of shaft 132, and a circular retaining head 136 at the opposite end of the shaft.

Figure 17:
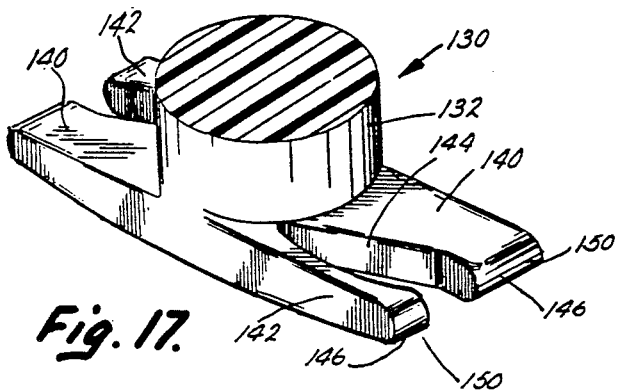
FIG. 17 is a fragmentary, perspective view of the trim engaging end of a fourth embodiment of the fastener of the present invention.
Figure 19:
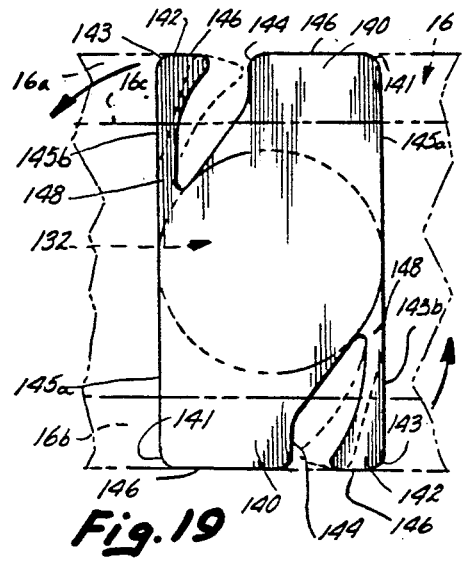
FIG. 19 is an end elevation of the fastener of FIGS. 17 and 18 taken from the trim strip engaging or flange end of the fastener.
Figure 20:
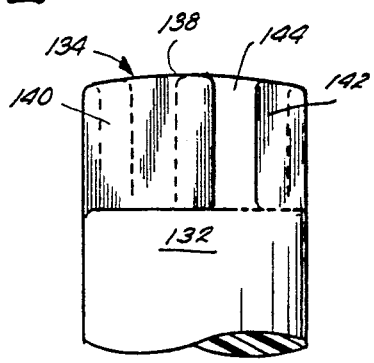
FIG. 20 is a fragmentary, side elevation of the trim engaging end of the fastener of FIGS. 17-19.
Figure 21:
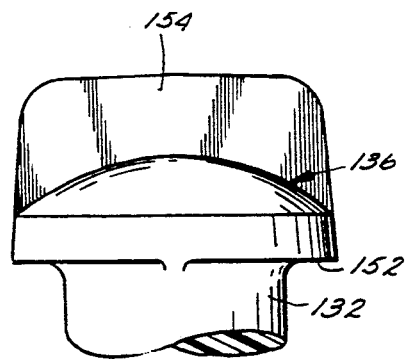
FIG. 21 is a fragmentary, side elevation of the retaining head end of the fastener of FIGS. 17-20.
Figure 22:
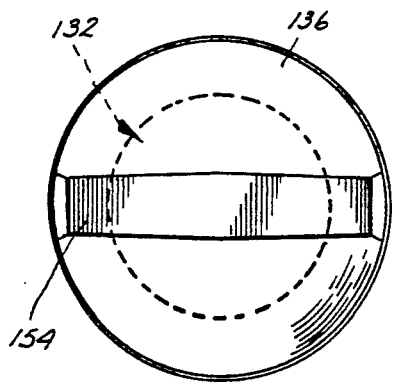
FIG. 22 is an end view of the fastener of FIGS. 17-21 taken from the retaining head end.

As is best seen in FIGS. 17-20, the outer surface 138 of the flange end of fastener 130 is rounded outwardly in a convex manner extending from end to end and side to side of the opposed flanges 134. As in the other fasteners mentioned above, such convex shape matches the interior surface of the trim member 16 which the fastener is designed to enter and retain as shown in FIG. 19. As also shown in FIGS. 17, 19 and 20, flanges 134 preferably each include a rigid, fixed portion 140 and a thin flange portion 142 which is flexibly joined to shaft 132 to allow flexure and movement as shown in phantom in FIG. 19. The fixed and flexible portions 140 and 142 are separated from one another by a configured slot 144 which angles inwardly toward a side of shaft 132 from end surface 146 of each flange 134. The side surfaces 145a, 145b of flange portions 140, 142 are preferably tangentially aligned with surfaces of shaft 132 as shown in FIG. 19, and extend generally perpendicularly to end surfaces 146 prior to insertion. Flexible flange portion 142 includes a wider outer end area tapering to a thin neck area 148 allowing flexure as shown in FIG. 19. When the fastener is inserted in the elongated slot 16c of the hollow, C-shaped trim member 16 and rotated in a counterclockwise direction as shown by the arrows in FIG. 19, the flexible portion 142 bends into slot 144 thereby reducing the width of the overall flange member and allowing rotation into the retaining position shown in FIG. 19. In this position flanges 134 are generally perpendicular to the elongated slot 16c of trim member 16 with end surfaces 146 engaging the opposed interior sides of the trim member.

Preferably, flange portions 140, 142 are generally equivalent in length and coterminous while the end surfaces 146 are rounded with their undersides 150 inclined or beveled toward the cylindrical shaft in the same manner as the flanges on fastener 12 above. The angle of the bevel of surfaces 150 is adapted to match the angle of the interior surfaces of flanges 16a, 16b on the trim member.

Figure 18:
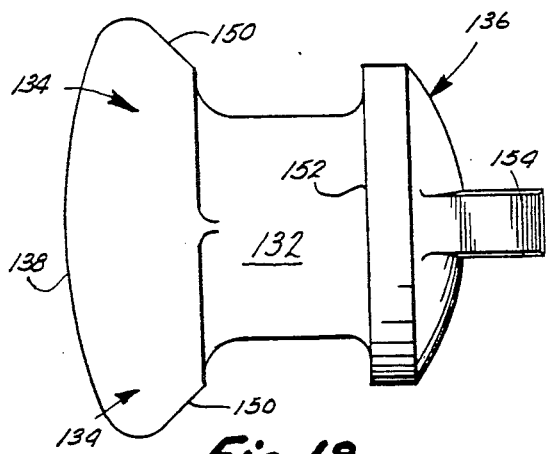
FIG. 18 is a side elevation of the rotational fastener of FIG. 17.

At the opposite end of shaft 132 from flanges 134, retaining head 136 is formed in a circular shape having a diameter larger than that of shaft 132 but smaller than the full extent of flanges 134 as shown in FIG. 18. Unlike retaining head 54 on fastener 12, retaining head 136 does not include any locking recesses or camming surfaces since the flanges 134 provide the necessary locking action without requiring the use of such surfaces on the retaining head and without the inclusion of any projections 46 adjacent the aperture through which the fastener is inserted. Rather, the underside 152 of retaining head 136 is generally planar and adapted to match the planar surface adjacent the generally rectangular aperture such as that shown at 122 in FIG. 16. Retaining head 136 also includes a gripping flange 154 extending across the diameter of the head and outwardly away from the head to provide a gripping surface for rotational insertion of the fastener.

As shown in FIG. 19, corners 141, 143 on flange members 134 of fastener 130 are relatively sharp between the perpendicular side and end surfaces 145, 146. After rotational insertion as explained above, flange portions 140, 142 are generally in the position shown in FIG. 19. The end surfaces 146 on both fixed and flexible flange portions engage the interior of the trim member to prevent further rotation either clockwise or counterclockwise. If counterrotation to that used to insert the fastener is attempted, however, the flexible nature of flange portion 142 allows it to stay in position as shown in FIG. 19 even though the remainder of the fastener is rotated in a clockwise direction. Thus, removal of the fastener by counterrotation is resisted by the retention of flexible flange members 142 in engagement with the trim member.

If sufficient rotational force is applied to the fastener in the clockwise direction, however, fracture of the thin neck portions 148 can be induced to allow removal of the fastener although the fastener will not be reusable thereafter. Likewise, extended rotation in the counterclockwise direction after insertion of the fastener into the position shown in FIG. 19 is resisted by the end surfaces 146 on fixed flange members 140 including the relatively sharp right angle corners 141. There is no need to offset flanges 134 on shaft 132 as in fastener 12 because alignment of the fastener with any projections such as those shown at 46 adjacent the aperture is not necessary. This allows use of rectangular apertures such as that shown at 122 in FIG. 16. Indeed, the fastener can move anywhere along the length of the aperture 122 after insertion but prior to rotation within the trim member and still provide the necessary retaining engagement with the trim member since head 136 is circular and has a planar undersurface which can engage the areas around the aperture in any position and the flanges 134 can engage the trim member in any position therealong.

In addition, it is possible to utilize a square, rectangular or other noncircularly-shaped shaft 132 together with flanges 134 on fastener 130 to further resist rotation of the fastener after insertion in the same fashion as fastener 110 above. Alternately, although not necessary, flanges 134 could be laterally offset o the shaft 132 to allow use of configured apertures such as those shown at 38 in FIG. 3.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiment of the invention in which an exclusive property or privilege, is claimed are defined as follows:

1. A one-piece fastener adapted to be rotated upon insertion in a support element for attaching a first member to the support element comprising:
   a shaft having two ends and a central axis;
   at least one first member engaging flange at one end of said shaft, said flange extending outwardly from said shaft;
   a retaining head having an underside facing said one end at the other end of said shaft, said retaining head including locking means for engaging at least one projection on the support element following rotation of said fastener to retain said fastener, the support element and the first member together; and camming means for engaging the projection during rotation to position said locking means in engagement with the projection
   said camming means including a sloped surface on said underside of said retaining head, said sloped surface extending from a first position to a second position, said second position being spaced closer to said one end of said shaft than said first position;
   said locking means including a locking recess positioned on said retaining head for receiving the projection on the support element after engagement with said sloped surface and resisting further rotation or counterrotation of said fastener, said locking recess being immediately adjacent said second position of said sloped surface such that said sloped surface terminates at said locking recess.

2. The fastener of claim 1 including gripping means on said head for rotating said fastener to engage said flange with said first member and said camming means and locking means with the projection.

3. The fastener of claim 2 wherein said gripping means is a flange extending outwardly of said retaining head in a plane including said central axis.

4. The fastener of claim 1 including an inclined surface on said first member engaging flange for engaging and camming said flange over a portion of the first member.

5. The fastener of claim 1 including a pair of said first member engaging flanges at said one end of said shaft, said first member engaging flanges extending radially outwardly in opposite directions from said shaft.

6. The fastener of claim 5 wherein the first member is of the type including an inclined portion thereof; each flange including an end surface which is beveled for cooperation with the inclined portion of the first member.

7. The fastener of claim 5 wherein said first member engaging flanges are laterally offset from one another and from said central axis of said shaft.

8. The fastener of claim 1 wherein said locking recess is circumferentially aligned with said camming means.

9. The fastener of claim 8 wherein said retaining head includes a circular edge; said locking recess being located in a first portion of said edge; said locking means including a second locking recess in a separate portion of said retaining head edge, said separate edge portion being spaced diametrically opposite said first edge portion; said camming means including a pair of said sloped surfaces spaced diametrically opposite one another on said underside of said retaining head, each of said sloped surfaces leading from a start area at said first position to an end area immediately adjacent one of said locking recesses at said second position.

10. The fastener of claim 1 wherein said locking recess includes an upstanding wall extending generally parallel to said central axis.

11. The fastener of claim 1 wherein said locking recess includes a pair of upstanding walls, each wall extending generally parallel to said central axis, said walls being generally at right angles to one another.

12. A fastener adapted to be rotated upon insertion in a support element for attaching a first member to the support element comprising:
 a shaft having two ends, a central axis, and a pair of first member engaging flanges at said one end of said shaft, said first member engaging flange extending radially outwardly in opposite directions from said shaft; each first member engaging flange including an end surface which is beveled for cooperation with an inclined portion of the first member;
 a retaining head at the other end of said shaft, said retaining head including locking means for engaging at least one projection on the support element following rotation of said fastener to retain said fastener, the support element and the first member together; and camming means for engaging the projection during rotation to position said locking means in engagement with the projection;
 said first member comprising a trim molding and a support element which is selected from the group including a vehicular body molding and a vehicular window assembly; said support element including an aperture for receiving said fastener and a projection adjacent said aperture; said trim molding having a general C shape in section and an elongated slot allowing insertion of said first member engaging flanges of said fastener within the interior of the trim molding, said beveled flange ends engaging inclined interior surfaces of the trim molding after insertion through said aperture and subsequent rotation while said locking means engage said projection.

13. The fastener of claim 12 wherein said first member engaging flanges are laterally offset from one another and from said central axis of said shaft; said aperture in said support member being shaped to received said offset flanges whereby said fastener is generally centered in said aperture and prevented from sliding along said aperture and said elongated slot of the trim molding during insertion.

14. An assembly comprising a fastener, support element and a first member, said fastener being rotatable upon insertion in said support element for attaching said first member to said support element;
 said fastener including a single shaft having two ends and a central axis; a pair of flange members at one end of said shaft for engaging said first member, said flange members extending outwardly from said shaft and being laterally offset from one another and from said central axis of said shaft; and a retaining head at the other end of said shaft for engaging said support element following insertion and rotation of said fastener to retain said fastener, said support element and said first member together;
 said support element and first member each including an aperture receiving said fastener, said aperture in said support element being generally contoured to the outline of and shaped to receive said offset flange members and said shaft whereby said fastener is generally centered in said aperture and prevented from sliding along said aperture during and after insertion.

15. The assembly of claim 14 wherein said support element includes a projection thereon; said retaining head including locking means for engaging said projection on said support element following rotation of said fastener.

16. The assembly of claim 15 wherein said retaining head further includes camming means for engaging said projection during rotation to position said locking means in engagement with said projection.

17. The assembly of claim 16 wherein said retaining head includes an edge; said locking means including a recess in a first portion of said retaining head edge for receiving said projection on said support element after insertion of said fastener therein.

18. The assembly of claim 17 wherein said recess is circumferentially aligned with said camming means.

19. The assembly of claim 18 wherein said camming means include a sloped surface on the underside of said retaining head and extending from a first position to a second position in a direction along said central axis, said second position being spaced closer to said one end of said shaft than said first position.

20. The assembly of claim 19 wherein said retaining head edge is circular; said locking means including a second recess in a separate portion of said retaining head edge, said separate edge portion being spaced diametrically opposite said first edge portion; said camming means including a pair of said sloped surfaces spaced diametrically opposite one another on said underside of said retaining head, each of said sloped surfaces leading from a start area at said first position to an end area immediately adjacent one of said recesses at said second position.

21. The assembly of claim 16 wherein said camming means includes at least one sloped surface on the underside of said retaining head and extending from a first position to a second position in a direction along said central axis, said second position being spaced closer to said one end of said shaft than said first position.

22. The assembly of claim 16 including gripping means on said head for rotating said fastener to engage said flange member with said first member and said camming means and locking means with said projection.

23. The assembly of claim 14 wherein said flange members in said pair at said one end of said shaft extend radially outwardly in opposite directions from said shaft.

24. The assembly of claim 23 wherein said first member includes an inclined portion thereon; each flange member including an end surface which is beveled for cooperation with said inclined portion of said first member.

25. A trim assembly for vehicles comprising:
 a trim member;

a support element for supporting said trim member;

a fastener for retaining said trim member on said support element;

said support element having two surfaces and including at least one aperture extending from one of said surfaces to the other for receiving said fastener, and at least one projection adjacent said aperture on said one surface of said support element;

said trim member being an elongated strip having an elongated slot allowing insertion of said fastener, and inclined interior surfaces adjacent said slot;

said fastener including a shaft having two ends and a central axis;

at least one trim member engaging flange at one end of said shaft, said flange extending outwardly from said shaft;

a retaining head at the other end of said shaft, said retaining head including locking means for engaging said projection on said support element following rotation of said fastener to retain said fastener, said support element and said trim member together; and camming means on said retaining head for engaging said projection during rotation to position said locking means in engagement with said projection.

26. The trim assembly of claim 25 including means on said fastener and support element for preventing longitudinal movement of said fastener in said aperture during and after insertion.

27. The trim assembly of claim 26 wherein said means on said fastener and support element include a contoured aperture and portions of said fastener shaft; said shaft having a second flange member at said one end of said shaft; said flange members extending radially outwardly from said fastener shaft and being laterally offset from one another and said central axis of said shaft; said aperture in said support element being shaped to receive said offset flange and said shaft whereby said fastener is generally centered in said aperture and prevented from sliding along said aperture and said elongated slot of said trim molding during and after insertion.

28. The trim assembly of claim 25 wherein said trim member engaging flange includes an end surface which is beveled for cooperation with an inclined portion of the first member.

29. The trim assembly of claim 25 wherein said retaining head includes an edge; said locking means including a recess in a first portion of said retaining head edge for receiving said projection on said support element after insertion of said fastener therein.

30. The trim assembly of claim 29 wherein said recess is circumferentially aligned with said camming means.

31. The trim assembly of claim 30 wherein said camming means include a sloped surface on the underside of said retaining head and extending from a first position to a second position in a direction along said central axis, said second position being spaced closer to said one end of said shaft than said first position.

32. The trim assembly of claim 31 wherein said retaining head edge is circular; said locking means including a second recess in a separate portion of said retaining head edge, said separate edge portion being spaced diametrically opposite said first edge portion; said camming means including a pair of said sloped surfaces spaced diametrically opposite one another on said underside of said retaining head, each of said sloped surfaces leading from a start area at said first position to an end area immediately adjacent one of said recesses at said second position.

33. The trim assembly of claim 25 wherein said camming means include at least one sloped surface on the underside of said retaining head and extending from a first position to a second position in a direction along said central axis, said second position being spaced closer to said one end of said shaft than said first position.

34. The trim assembly of claim 25 wherein said support element is a portion of a casing adjacent a sheet of transparent material on a window assembly.

35. The trim assembly of claim 34 wherein said casing includes an elongated recess on its exterior surface for receiving said trim member; said aperture being aligned with and opening into said elongated recess.

36. The trim assembly of claim 25 wherein said support element is a vehicular body molding adapted for mounting on the body of a vehicle.

* * * * *

UNITED STATES PATENT AND TRADEMARK OFFICE
CERTIFICATE OF CORRECTION

PATENT NO.   : 5,142,834
DATED        : September 1, 1992
INVENTOR(S)  : Thomas J. Laclave
               Keith A. Nieboer It is certified that error appears in the above-identified patent and that said Letters Patent is hereby corrected as shown below:

Column 2, line 64;
    After "strip" insert --.--.
Column 3, line 65;
    After "assembly" insert --for--.
Column 5, line 3;
    "position o" should be --position of--.
Column 5, line 26;
    After "material" (first occurrence) insert --.--.
Column 6, line 63;
    After "walls 76," insert --78--.
Column 7, line 58;
    "which ar" should be --which are--.
Column 9, line 68;
    "offset o" should be --offset on--.
Column 10, line 58;
    "thereof" should be --thereon--.
Column 11, line 54, claim 13;
    "received" should be --receive--.

Signed and Sealed this

Twenty-sixth Day of October, 1993

Attest:

BRUCE LEHMAN

Attesting Officer        Commissioner of Patents and Trademarks